March 28, 1961 C. H. SPECKMAN 2,976,665
ROTARY MOWER
Filed July 14, 1959 2 Sheets-Sheet 1
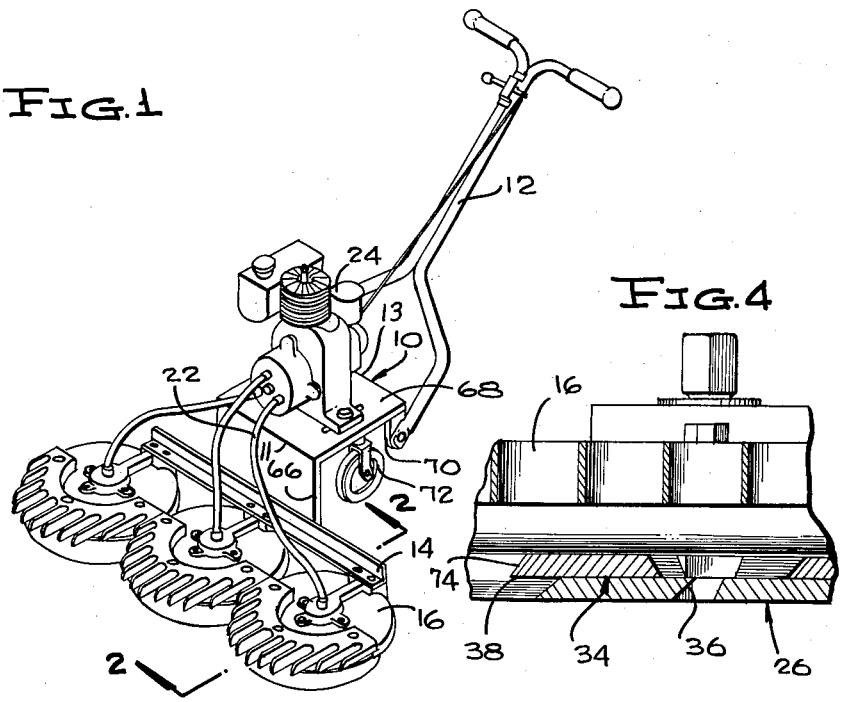
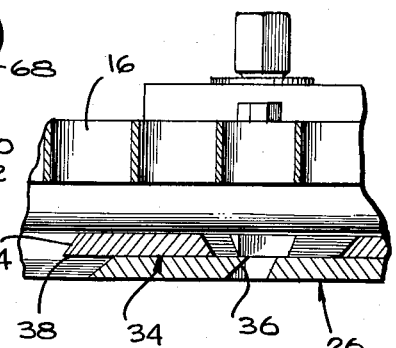
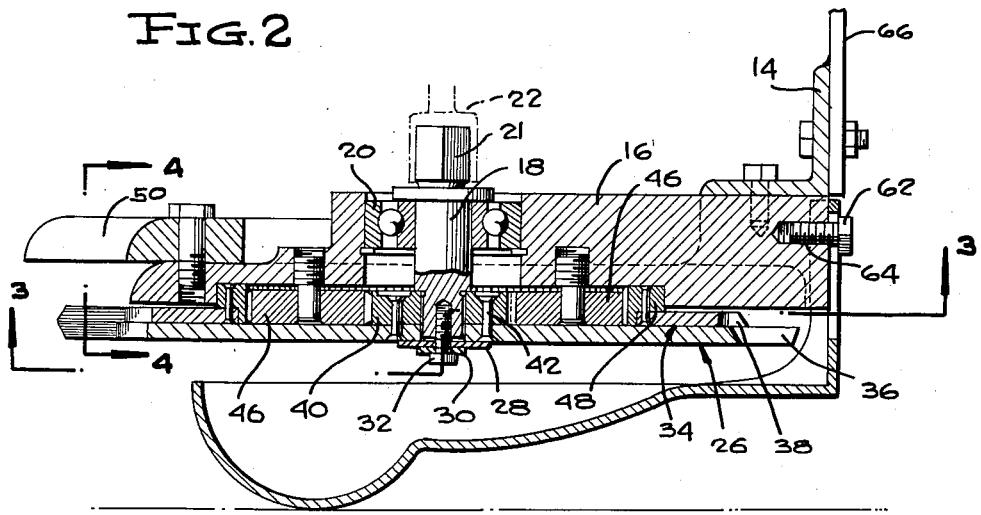
INVENTOR.
CLIFFORD H. SPECKMAN
BY
McMorrow, Berman & Davidson
ATTORNEYS

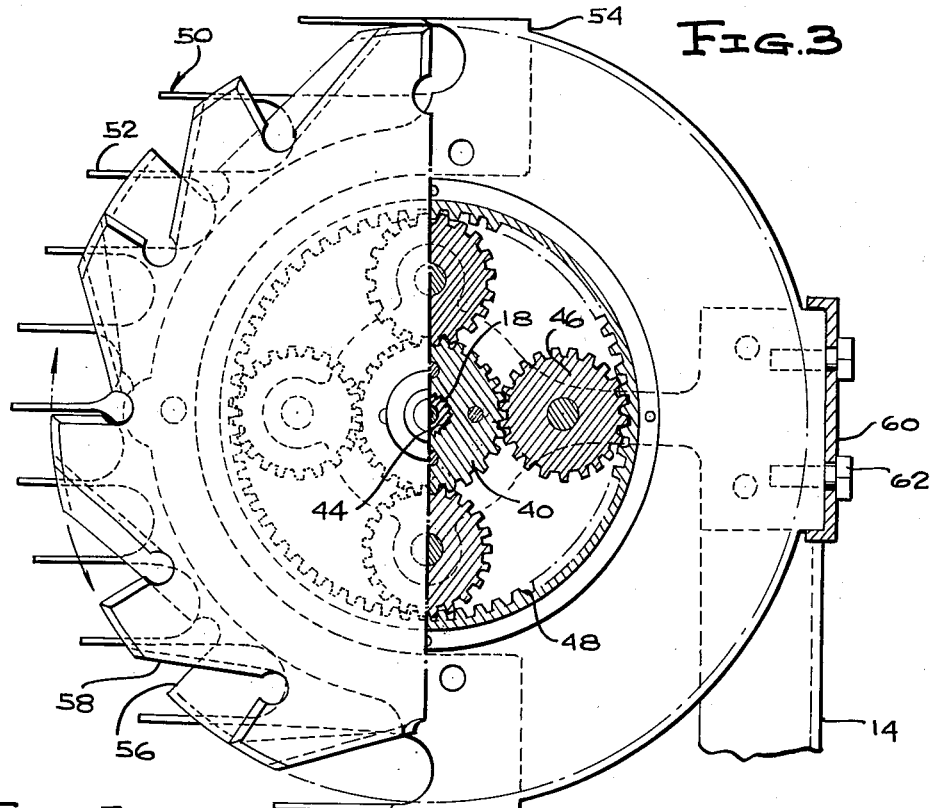
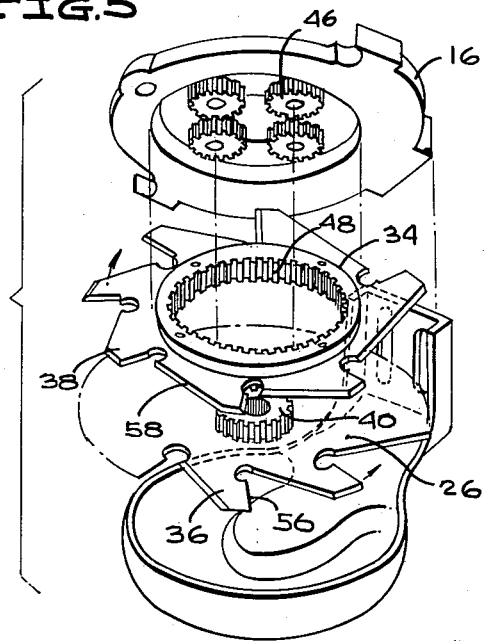
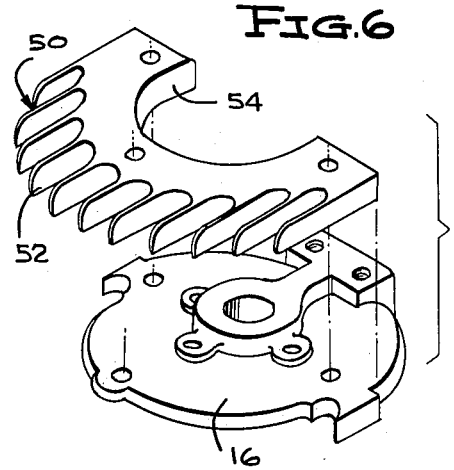
INVENTOR.
CLIFFORD H. SPECKMAN
BY
McMorrow, Berman & Davidson
ATTORNEYS United States Patent Office 2,976,665
Patented Mar. 28, 1961

2,976,665
ROTARY MOWER
Clifford H. Speckman, Cobbs Hill, Aurora, Ind.
Filed July 14, 1959, Ser. No. 827,115
2 Claims. (Cl. 56—255)

The present invention relates to mowers generally and particularly to a rotary mower.

Previously proposed have been rotary mowers for cutting of hay and the like and generally such mowers as have been proposed are of the endless chain type having a plurality of cutting blades carried by a chain and traveling in a horizontal plane between spaced sprocket wheels or other support means. Such mowers have not been generally acceptable for the reason that the chains are subject to undue wear and have short life characteristics. Additionally, rotary mowers of the chain type have in the past been subject to the disadvantage of having a higher friction loss than the reciprocating type of sickle bar mower. Further, rotary mowers of the chain type are unsatisfactory in that they do not conform to the contour of the ground and the blades thereof are subject to undue wear when striking elevated portions of the ground.

An object of the present invention is to provide a rotary mower which may be employed to traverse the relatively uneven ground without damage to the cutter blades.

Another object of the present invention is to provide a rotary mower which may be fabricated in any length desired, one employing a plurality of identical mower units each lending itself to efficient operation and each having a low power loss due to friction.

A further object of the present invention is to provide a rotary mower of simple structure, one having a minimum of moving parts, one highly effective in action and one economically feasible.

These and other objects and advantages of the present invention will be fully apparent from the following description when taken in conjunction with the annexed drawings, in which:

Figure 1 is an isometric view of the rotary mower according to the present invention, Figure 2 is a sectional view on an enlarged scale, taken on the line 2—2 of Figure 1, Figure 3 is a sectional view taken on the line 3—3 of Figure 2, Figure 4 is a sectional fragmentary view taken on the line 4—4 of Figure 2, Figure 5 is an isometric exploded view of the blades and support components of the rotary mower of the present invention, and Figure 6 is an isometric exploded view of the support and comb means of the rotary mower of the present invention.

Referring in greater detail to the drawings in which like numerals indicate like parts throughout the several views, the rotary mower according to the present invention comprises a mobile frame 10 having a forward end 11 and a rearward end 13 with a handle 12 projecting from the rearward end. An angle iron support 14 extends transversely of and is secured to the forward end of the frame 10. A plurality of horizontally disposed support plate members 16, here shown as three in number, project forwardly of and below the support 14 and are arranged in lateral spaced relation therealong.

In each of said support plate members 16 there is rotatably mounted a vertically disposed shaft 18. A bearing assembly 20 (Figure 2) supports each shaft 18 in the adjacent support plate member 16. The upper end portion of each shaft 18 is provided with means for attachment thereto of a drive shaft, in this instance such means being the upper end portion of each shaft 18 being constructed to a square shape. To the square end portion 21 of each shaft 18 is attached an end of a flexible drive shaft 22 whose other end is attached to a prime mover such as an internal combustion engine 24 as illustrated in Figure 1.

Referring to Figure 2, a first horizontally disposed disc 26 is shown circumposed about the shaft 18 adjacent the lower end of the latter and is secured to the shaft 18 by means of washers 28 and 30 and a bolt 32. A second horizontally disposed disc 34 is circumposed about the shaft 18 and is superposed from the disc 26.

The discs 26 and 34 have spaced cutter blades 36 and 38, respectively, projecting from the peripheries thereof. Means is provided connecting each of the second discs 34 to the adjacent shaft 18 so that the second discs 34 rotate at a slower speed than and in the opposite direction from the adjacent first disc 26.

Specifically, this means includes a pinion 40 secured to the upper face of each of the discs 26 by means of rivets 42 or other conventional means, each pinion 40 being secured by splines 44 (Figure 3) to the adjacent portion of the adjacent shaft 18. The means also include a plurality of pinions 46 rotatably mounted on the underside of the support plate member 16 adjacent each shaft 18 and in meshing engagement with the adjacent pinion 40. The rotatable pinions 46 are also in meshing engagement with a ring gear 48 formed on the adjacent disc 34.

A horizontally disposed comb 50 overhangs and projects beyond the forward peripheral portion of the blades 36 and 38 of each shaft 18.

Each comb 50 consists in a plurality of teeth 52 projecting from a base member 54 which is secured by bolts or other means to the top of the adjacent support member 16.

An important feature of the present invention resides in the fact that the blades 36 of a cutting disc 26 are arranged with radially extending cutting edges, as at 56 in Figure 5, while the cutting edges 58 of the blades 38 of the disc 34 are tangentially arranged or obliquely arranged relative to the ring gear 48 and the edges 56 of the disc 26, respectively.

A shoe 60 is dependingly supported from each of the support plate members 16 by means of a bolt 62 extending into a tapped bore 64 provided in the rearward portion of the adjacent support plate member 16. The frame 10 is of L-shaped configuration with the short leg 66 vertical and bolted to the support 14. The long leg 68 of the frame 10 forms a platform for the engine 24 and the handle 12 has its forward end pivotally connected to lugs 70 which depend from the free end of the leg 68. A caster wheel assembly 72 depends from the leg 68 intermediate the ends thereof and supports the frame 10 for traveling movement over a ground surface.

In use, the rotary mower according to the present invention may be propelled by hand over a ground surface with power supplied to each of the shafts 18 so that the disc 26 revolves in one direction and the disc 34 revolves in the other direction. The number of teeth on the pinions 40, 46, and on the ring gear 48 of each of the mower units is such that the blade disc 26 rotates at a greater speed than the associate blade disc with the speed of the blades 36 approximately two and one-third times the speed of the blades 38.

Another important feature of the present invention resides in the configuration of the rear sides of the blades 38 of the disc 34 which slope as at 74 in Figure 4 and serve to create an area of low pressure as a blade 34 rotates. This low pressure area adjacent the periphery of the disc 34 serves to hold the grass and hay in an erect condition as the mower is advanced over a ground surface.

What is claimed is:

1. In a rotary mower, a support, vertically disposed rotatable shaft carried by said support, a first horizontally disposed disc circumposed about said shaft and connected to said shaft for rotation with the latter, said disc having cutter blades projecting from the periphery thereof, a second horizontally disposed disc superimposed upon said first disc and circumposed about said shaft, said second disc having cutter blades projecting from the periphery thereof, and means embodying a pinion carried by said shaft and in meshing engagement with a plurality of pinions rotatably mounted upon said support, and a ring gear formed on said second disc and in meshing engagement with said plurality of pinions, connecting said second disc to said shaft so that said second disc rotates at a slower speed than and in an opposite direction to said first disc.

2. In a rotary mower, a mobile frame having a forward end, a support extending transversely of and secured to the forward end of said frame, a plurality of vertically disposed rotatable shafts arranged in lateral spaced relation along and forwardly of and mounted on said support, a first horizontally disposed disc circumposed about each of said shafts and connected to said shaft for rotation with the latter, each of said discs having cutter blades projecting from the periphery thereof, a second horizontally disposed disc superimposed upon each of said first discs and circumposed about the adjacent shaft, each of said second discs having cutter blades projecting from the periphery thereof, and means connecting each of said second discs to the adjacent shaft so that each of said second discs rotates at a slower speed than and in an opposite direction to the adjacent first disc, said means embodying a pinion carried by each of said shafts and in meshing engagement with a plurality of pinions rotatably mounted on said support, and a ring gear formed on the adjacent second disc and in meshing engagement with said plurality of pinions.

References Cited in the file of this patent

UNITED STATES PATENTS

| | | |
|---|---|---|
| 784,396 | Hall | Mar. 7, 1905 |
| 1,130,283 | Hewett et al. | Mar. 2, 1915 |
| 1,555,011 | Keith | Sept. 29, 1925 |
| 1,558,568 | St. John | Oct. 27, 1925 |
| 2,171,750 | Hooe | Sept. 5, 1939 |
| 2,448,091 | Gardner | Aug. 31, 1948 |